United States Patent
Urban et al.

(10) Patent No.: US 10,311,448 B2
(45) Date of Patent: Jun. 4, 2019

(54) DIGITAL SIGNAGE SYSTEM

(75) Inventors: William Eugene Urban, Chicago, IL (US); Shawn Thomas Tomovick, Chicago, IL (US)

(73) Assignee: William Eugene Urban, Hinsdale, IL (US)

( * ) Notice: Subject to any disclaimer, the term of this patent is extended or adjusted under 35 U.S.C. 154(b) by 309 days.

(21) Appl. No.: 13/211,079

(22) Filed: Aug. 16, 2011

(65) Prior Publication Data

US 2012/0047024 A1 Feb. 23, 2012

Related U.S. Application Data

(60) Provisional application No. 61/375,192, filed on Aug. 19, 2010.

(51) Int. Cl.
*G06Q 30/00* (2012.01)
*G06Q 30/02* (2012.01)
*G06Q 20/10* (2012.01)
*G06Q 30/06* (2012.01)

(52) U.S. Cl.
CPC ............ *G06Q 30/02* (2013.01); *G06Q 20/10* (2013.01); *G06Q 30/0273* (2013.01); *G06Q 30/06* (2013.01)

(58) Field of Classification Search
CPC ...................................... G06Q 30/0207–0277
USPC .............................................. 705/14.1–14.73
See application file for complete search history.

(56) References Cited

U.S. PATENT DOCUMENTS

| | | |
|---|---|---|
| 5,404,566 A | 4/1995 | Wehrmeyer |
| 6,950,804 B2 | 9/2005 | Strietzel |
| 7,010,293 B2 | 3/2006 | Go |
| 7,013,290 B2 | 3/2006 | Ananian |
| 7,036,736 B2 | 5/2006 | Sarbaz et al. |
| 7,129,825 B2 | 10/2006 | Weber |
| 7,278,518 B2 | 10/2007 | Newville et al. |

(Continued)

FOREIGN PATENT DOCUMENTS

| | | |
|---|---|---|
| EP | 2326087 A1 * | 5/2011 |
| WO | WO 0057624 A2 * | 9/2000 |

(Continued)

OTHER PUBLICATIONS

"Digital Display Software—Rise Display Network" webpages downloaded from http://www.risedisplaynetwork.com/ (available at least as early as Jun. 15, 2010).

(Continued)

*Primary Examiner* — Matthew T Sittner
*Assistant Examiner* — Allan J Woodworth, II
(74) *Attorney, Agent, or Firm* — Michael Best & Friedrich LLP

(57) ABSTRACT

A method of operating a digital signage system. The method includes creating at least one user account, creating or retrieving a display content to be displayed on a display device, searching for a display location and at least one display device associated with the display location, and sending a request to display the content on at least one selected display device. The method further includes automatically downloading the content to be displayed on the selected display device, automatically processing a payment from a first user account to a second user account that is associated with the display device, and displaying the content on the selected display device.

10 Claims, 5 Drawing Sheets

(56) References Cited

U.S. PATENT DOCUMENTS

| | | | |
|---|---|---|---|
| 7,509,267 B1 | 3/2009 | Yarmolich et al. | |
| 7,595,740 B2 | 9/2009 | Pechenick et al. | |
| 7,650,444 B2 | 1/2010 | Dirstine et al. | |
| 7,742,950 B2* | 6/2010 | Wolinsky | G06Q 30/0248 705/27.1 |
| 8,059,791 B2* | 11/2011 | Schwartz | 379/88.12 |
| 2002/0164962 A1 | 11/2002 | Mankins et al. | |
| 2002/0167416 A1 | 11/2002 | Polyakov | |
| 2003/0050744 A1 | 3/2003 | Saraiva | |
| 2004/0036622 A1 | 2/2004 | Dukach et al. | |
| 2008/0155589 A1* | 6/2008 | McKinnon | G06Q 30/02 725/34 |
| 2009/0012867 A1 | 1/2009 | Lerman et al. | |
| 2009/0157552 A1 | 6/2009 | Schnell et al. | |
| 2009/0168901 A1 | 7/2009 | Yarmolich et al. | |
| 2009/0177550 A1 | 7/2009 | Tutone | |
| 2009/0187480 A1* | 7/2009 | Bernard | G06Q 20/102 705/14.69 |
| 2009/0198542 A1 | 8/2009 | D'Amore et al. | |
| 2009/0204484 A1 | 8/2009 | Johnson | |
| 2009/0228920 A1 | 9/2009 | Tom et al. | |
| 2009/0240583 A1 | 9/2009 | Hemphill | |
| 2009/0248491 A1 | 10/2009 | Hemphill | |
| 2009/0265243 A1 | 10/2009 | Karassner et al. | |
| 2009/0271269 A1 | 10/2009 | Lieb et al. | |
| 2009/0287554 A1 | 11/2009 | Kim | |
| 2009/0292599 A1 | 11/2009 | Rampell et al. | |
| 2009/0292610 A1 | 11/2009 | Quach et al. | |
| 2009/0292612 A1 | 11/2009 | Van de Sluis et al. | |
| 2009/0293086 A1 | 11/2009 | Lutterbach et al. | |
| 2009/0299857 A1 | 12/2009 | Brubaker | |
| 2010/0070996 A1 | 3/2010 | Liao et al. | |
| 2012/0278167 A1* | 11/2012 | Schwartz | H04M 3/02 705/14.53 |

FOREIGN PATENT DOCUMENTS

| | | |
|---|---|---|
| WO | 2007109541 | 9/2007 |
| WO | 2009100072 | 8/2009 |
| WO | 2009108442 | 9/2009 |
| WO | 2009114622 | 9/2009 |

OTHER PUBLICATIONS

"DoubleDutch Features" webpages downloaded from http://doubledutch.me/features.aspx (available at least as early as Jun. 15, 2010).

"OnSite Network—Home of SportScape" webpage downloaded from http://www.sportscape.tv/ (available prior to Aug. 19, 2010).

"Rise Vision—Digital Signage" webpages downloaded from http://www.risevision.com/ (available at least as early as Jun. 15, 2010).

"ScreenScape Networks" webpages downloaded from http://www.screenscape.net/ (available at least as early as Jun. 30, 2010).

"Touchtunes-Barfly" webpages downloaded from http://tdmdistributors.com/touchtunes-barfly (available prior to Aug. 19, 2010).

"Vukunet" webpages downloaded from http://vukunet.com/ (available at least as early as Aug. 24, 2010).

\* cited by examiner

DIGITAL SIGNAGE SYSTEM

CROSS-REFERENCE TO RELATED APPLICATIONS

This application claims the benefit of and priority to U.S. Provisional Patent Application No. 61/375,192, filed Aug. 19, 2010, the entire contents of which are hereby incorporated by reference herein.

FIELD

The present invention relates to network-based digital signage systems.

BACKGROUND

Generally, digital signage is a convenient way by which businesses can promote their products or generate revenue by displaying advertising content for other businesses. However, digital signage systems and networks can be expensive to build and difficult to manage. Some of the existing digital signage systems generally require a user to purchase a special display device and equipment that operate the display device. Further, most of these systems provide users with previously created advertising materials. Although some systems allow users to create their own content, the exiting systems do not allow users or communities of users to set their own advertising rates so they can easily "buy and sell" advertisements online. Thus, it is difficult and expensive for some businesses to participate in these existing digital signage systems, particularly local or small businesses that do not have the financial resources to purchase digital signage equipment or that want to concentrate on local digital signage advertising.

SUMMARY

There is a need for an improved digital signage system that will allow users to create their own content, distribute it among a community of users, and generate revenue from the display of the content by, among other things, establishing their own rates for the display of the content. Further, there is a need for an improved digital signage system that can cover large geographical areas, as well as specific local regions in accordance with the desire of the system's users.

In one embodiment, the invention provides a method of operating a digital signage system. The method includes creating at least one user account, creating or retrieving a display content to be displayed on a display device, searching for a display location and at least one display device associated with the display location, and sending a request to display the content on at least one selected display device. The method further includes automatically downloading the content to be displayed on the selected display device, automatically processing a payment from a first user account to a second user account that is associated with the display device, and displaying the content on the selected display device In another embodiment, the invention provides a digital signage system for joining a network of digital subscribers and displaying content. The system includes a controller, a plurality of display devices in electronic communication with the controller, the display devices operable to display the content, and a user interface in electronic communication with the controller and the plurality of display devices. The system further includes a computer readable memory storing non-transitory programmed instructions that, when executed by the controller, cause the controller to create at least one user account, create or retrieve content to be displayed on a display device, search for a display location and at least one display device associated with the display location, send a request to display the content on at least one selected display device, automatically download the content to be displayed on the selected display device, automatically process a payment from a first user account to a second user account that is associated with the display device, and display the content on the selected display device.

In yet another embodiment, the invention provides a computer program embodied by a computer readable medium capable of being executed by a computer, the computer program for use in a digital signage system. The computer program includes a user profile module operable to create at least one user account, a content creation and edit module operable to create or modify the content to be displayed on at least one display device, a search module operable to retrieve a list of display locations and display devices based on a search, a communication module operable to send a request to display the content on at least one selected display device, a billing module operable to automatically process a payment from a first user account to a second user account that is associated with the display device, and a display module operable to display the content on at least one selected display device.

Other aspects of the invention will become apparent by consideration of the detailed description and accompanying drawings.

DETAILED DESCRIPTION

Figure 1:
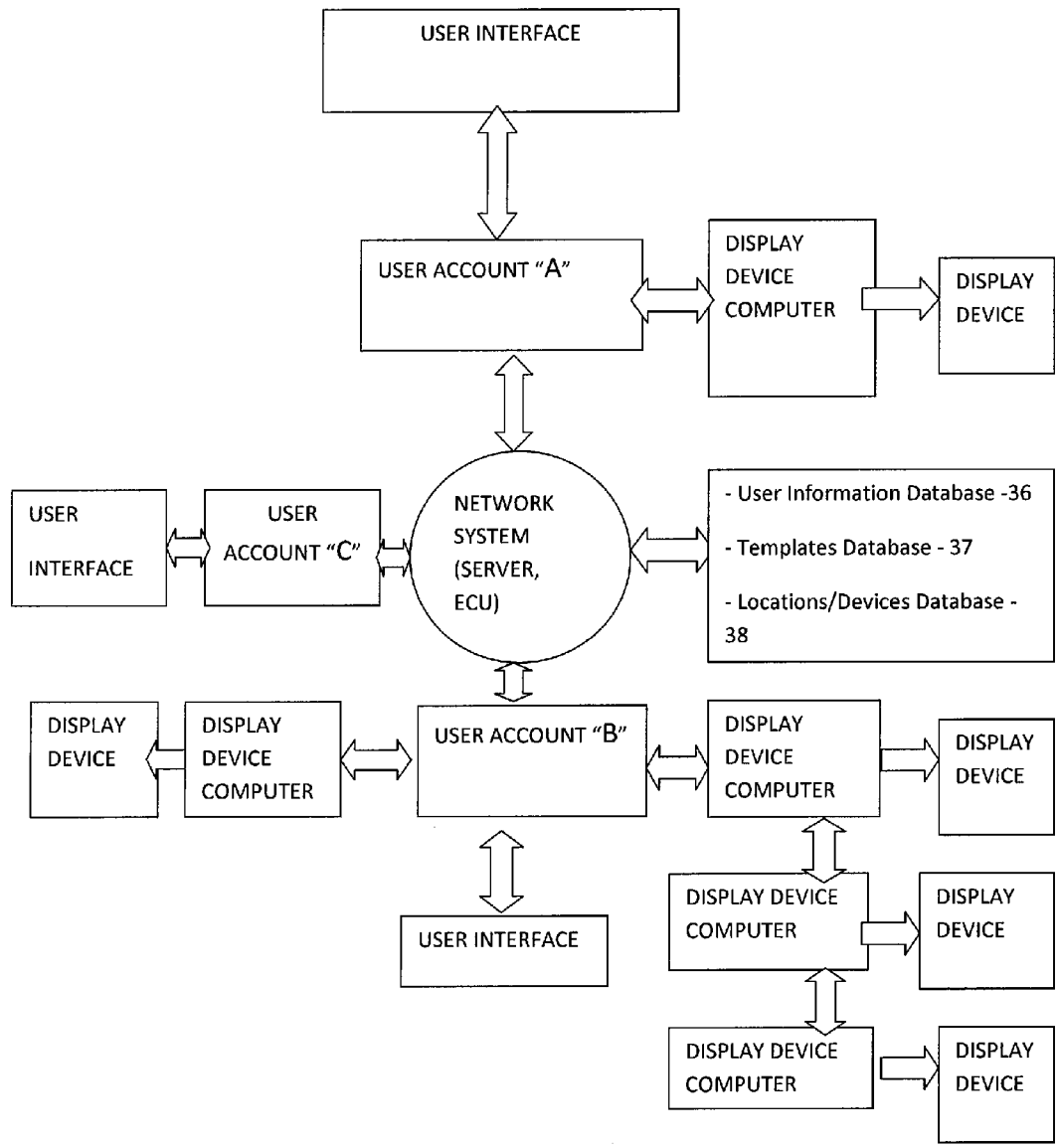
FIG. 1 is a schematic illustration of a digital signage system for displaying various content on a display device.

It should be understood that the invention is not limited in its application to the details of construction and the arrangement of components described herein or illustrated in the drawings. The invention is capable of other embodiments and of being practiced or carried out in various ways The systems shown in the figures are models of what actual systems might be like. It should also be noted that a plurality of hardware—and software—based devices, as well as a plurality of different structural components, may be utilized to implement the invention. Many of the modules and logical structures described are capable of being implemented in software executed by a microprocessor or a similar device or being implemented in hardware using a variety of components. As described in subsequent paragraphs, the specific configurations illustrated in the drawings are intended to exemplify embodiments of the invention and other alternative configurations are possible. Furthermore, throughout the specification capitalized terms are used. Such terms are used to conform to common practices and to help correlate the description with the coding examples, equations, and/or drawings. However, no specific meaning is implied or should be inferred simply due to the use of capitalization.

FIG. 1 illustrates a digital signage system 10 that allows users to participate in a network or "community" of subscribers, to create, send, and receive content (including advertisements) on a network, to display content on various displays for a fee determined by the users, and to automatically receive payments for displaying the content. The digital signage system 10 comprises a network system 15 that includes at least one server 20 that connects a user 25 (not shown) having a user account 30 with other users 25, and an Electronic Control Unit (ECU) 26 that controls the operation of the system 10. The server 20 is coupled to databases 27. The system 10 is operable on any online server network, including the Internet or any other public or private communication network (e.g., local area network, wide area network, cellular network, etc.).

The digital signage system 10 also includes a user interface 40 that is in electronic communication with the server 20 of the network system 15 and a display device 45. The display device 45 is generally placed at a specific display location 50 (not shown in FIG. 1). In some embodiments, the device location is a consumer environment (e.g., hospital, restaurant, office, hair salon, etc.). In other embodiments, the display location 50 is located in a different type environment (e.g., home, etc.). The display device 45 is connected to a display device machine 46 (e.g., a computer, an iPad, etc.) that includes a processor and is configured to control and operate the display device 45. In one embodiment, the computer 46 communicates with the server 20 of the network system 15 on one end, and with the display device 45 on the other end. In an embodiment, the display device computer 46 is an external computer connected to the display device 45 (e.g., desktop or laptop computer). In another embodiment, the display device computer 46 is built into the display device 45.

The user interface 40 can be a computer, a personal digital assistance ("PDA"), a telephone, or any other device that allows users 25 to access their accounts 30 on the network system 15 via the Internet or any other communication network. Every user interface 40 includes a controller 41 (e.g., a processor of a computer, not shown in FIG. 1) that communicates with the ECU 26 of the network system 15 and with other user interfaces. The display device 45 can be a television screen, a monitor, or any other type of screen that can electronically display different types of content. A user 25 can be directly connected to (i.e., can own or operate) several display devices 45. For example, a display location 50 (e.g., a restaurant) can have three of four television sets that are placed at different places in the restaurant. In addition, a user 25 can have a user account and can gain access to the system 10 without having or operating any display devices 45. For that purpose, users utilize their user account to connect to the network system 15 via the server 20 in order to use the system 10. These users would provide content for use on other users display devices.

The ECU 26 of the network system 15 receives inputs from the user interface 40 associated with a user account 30. The ECU 26 is a microcontroller that includes (or is connected to) memory (not shown) such as RAM and ROM and executes software that can be stored in the RAM (particularly during execution), the ROM (on a generally permanent basis), or another non-transitory computer readable medium, such as other memory or a disc. If necessary, the microcontroller can be connected to such memory or a disc drive to read such software. The ECU 26 may be implemented as a microprocessor or other programmable device (e.g., a field programmable gate array (FPGA), an application specific integrated circuit (ASIC), or the like) with suitable memory and I/O devices. In other embodiments, different types of memory can be used. The ECU 26 is configured to retrieve from memory and execute, among other things, instructions related to the methods described below.

The databases 27 include a user information database 36, a templates database 37, and a locations/devices database 38. In alternative embodiments, the system 10 can include more or less databases 27. The databases 27 are coupled to the server 20 via a data link. In some systems the data link is a direct wired or wireless coupling. In other embodiments, the data link is a local network connection, which can include wired and wireless connections. In still other systems, the server 20 is connected to the databases 27 using a non-local network, such as a wide area network, a cellular network, or the Internet. This embodiment may also include local network connections between the server 20 and databases 27. Each of the databases within databases 27 includes an addressable memory, such as a hard disc or other medium able to store and retrieve digital information. In some embodiments, all or a portion of the databases within databases 27 are stored in a single memory device. The databases 27 also include software for storing received data, searching stored data, receiving data requests, retrieving the requested data, and outputting the data to the requester or other appropriate recipient.

In some embodiments, some or all of the databases 27 are integrated with the server 20. In other embodiments, individual databases within databases 27 are divided into multiple sub-databases that may be located in different locations and coupled together or to the server 20 using various networks and devices. In some implementations, the server 20 is one or more of an Xserve server offered by Apple, a PowerEdge server offered by Dell, a System x or BladeCenter server offered by IBM, Blade server offered by Oracle, or the like. In some implementations, the databases 27 are maintained by database software such as Microsoft SQL Server, Oracle Database, IBM DB2, or the like. In other embodiments, the system can use a file (e.g., XML file) instead of or in combination with the databases 27.

FIG. 1 further illustrates some of the different types of users and user accounts that are associated with the digital signage system 10. For example, user account A shows a user 25 that owns and is connected to one display device 45. Further, user account B illustrates a user 25 that owns and is connected to more than one display device 45. These devices can be placed in a single location 50 (e.g., in a restaurant as described above) or can be placed in multiple locations. For example, a chain of hair salons (or any other suitable business chain) can have one or more display devices in every location that they own and all these display devices can be connected to one user account 30. Finally, user account C shows a user 25 that does not own any display devices 45. For example, this can be a locally owned automobile body shop (or other business) that does not have any display devices on its premises, but would like to be advertised on the display devices owned by other businesses in the area. A user 25 that owns one or several display devices 45 can access and control the content displayed on these devices via one user account 30.

The digital signage system 10 allows a user 25 to create and maintain user account 30 in exchange for a low monthly subscription payable to the owners/operators of the system 10. In an embodiment, the owners/operators of the system 10 also receive a percentage of the revenue generated by a user 25. A user can create and maintain a user account 30 by using any of the above identified user interfaces 40. For example, a user uses a computer to visit the system's website to create a user account 30 and to participate in the digital signage community of users. By creating a user account 30, users become part of the digital signage network or community and they can promote their businesses and receive revenues from promoting other businesses in the manner described herein. In other embodiments, the system 10 can be purchased and or licensed and can be downloaded to a user's device (e.g., as an application for an iPad or a computer).

By subscribing to and using the digital signage system 10, a user can connect and communicate with other users of the system 10. The system 10 allows users 25 to utilize their existing equipment (e.g., computer, PDA, TV, or monitor) to easily create content (e.g., an advertisement) that can be displayed on any display device 45. Users that own display device(s) 45 can set specific rates for displaying content of other users and can negotiate with other users regarding these rates. Users can communicate with each other using the system 10, including sending messages (e.g., emails). In an embodiment, users can receive messages about certain content (e.g., advertisement) that is sent to the account and can be downloaded if approved by the receiving users. In addition, the system 10 allows users 25 to bill automatically other users for displaying content and to receive payments (e.g., by using PayPal) from these users. Users can also create and update their personal or business profiles on the system 10. A business profile generally includes information regarding the type of business, the number and locations of display devices operated by this business, and the rates for displaying content on these devices. In one embodiment, the profiles can be viewed by the other users on the network. Thus, the system 10 offers an inexpensive and easy alternative to current digital signage systems. The system 10 allows users to participate in a community of network users and to generate revenue without making large investments or having outside pricing control.

Figure 2:
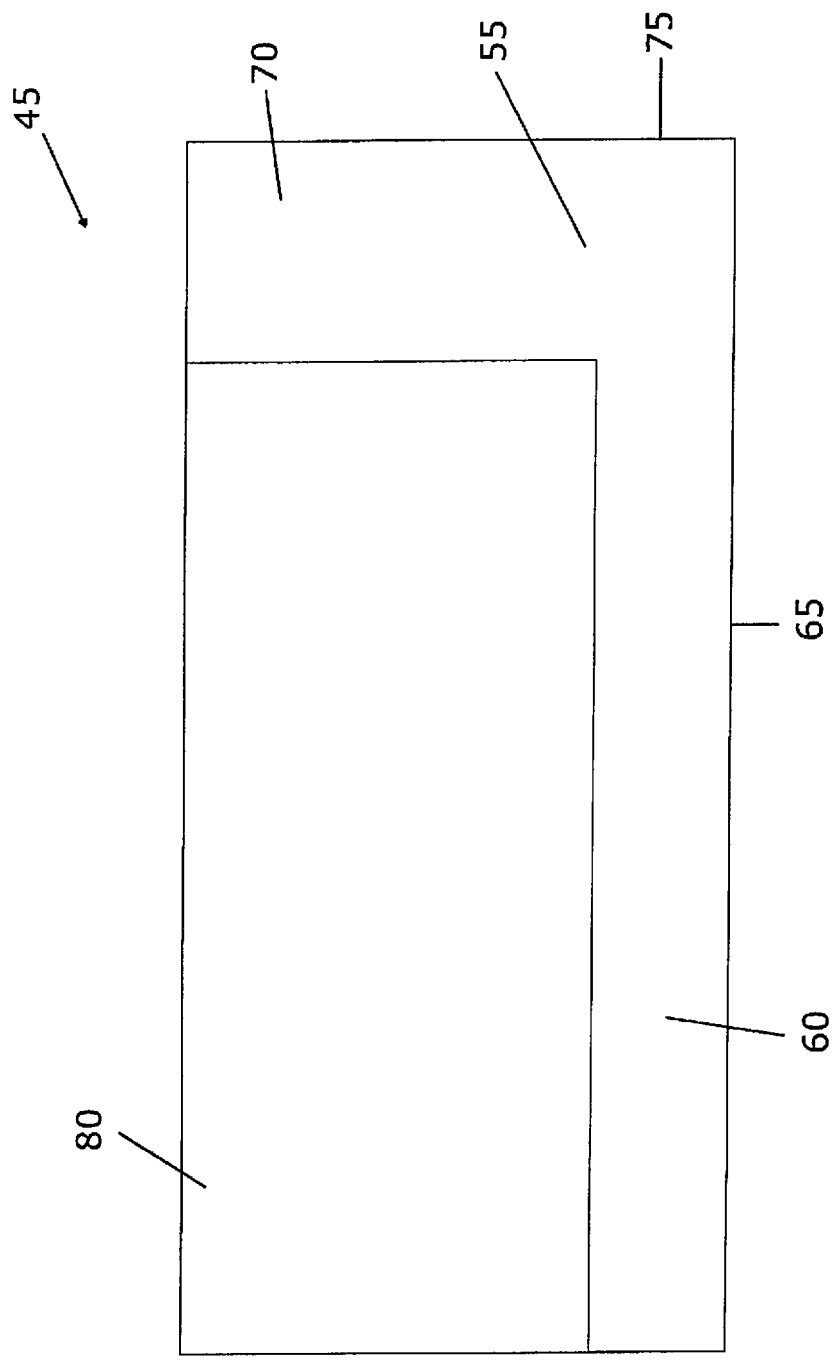
FIG. 2 is an illustration of a display device for the digital signage system of FIG. 1.

FIG. 2 illustrates an example of a display device 45 of the digital signage system 10 that is used to display different types of content. As mentioned above, the display device includes a television screen, a monitor, or any other type of screen. Thus, a user 25 that owns a display device 45 and a computer 46 is not required to purchase any new equipment in order to join the digital signage system 10 and to generate revenue from the display device. As previously stated, the display device 45 is connected to a display device computer 46 that can be any computer that a user owns. In one example, one display device computer 46 can be connected to a plurality of display devices 45 in the same location. In that example, all of the display devices will display the same content that is controlled by the display device computer 46. In another embodiment, each display device 45 at a location 50 is connected to a separate display device computer 46 so that they each display different content at the same time. In yet another embodiment, the computer 46 can be integrated within the display device 46 (e.g., a television-computer combination device). In the embodiment shown in FIG. 2, the specific content displayed by a user 25 is generally displayed in the lower right-hand corner of the display device 45, in a uniform content display area 55 that has a generally l'shaped form. In various embodiments, the content display area 55 can have other forms and shapes or the system 10 can use the full screen of the display device 45.

In one embodiment, the 'L' shaped display area 55 utilizes approximately 30 percent of the total screen or display area of the display device 45 at a 16×9 aspect ratio. In alternative embodiments, the 'L' shaped display area 55 may utilize a greater or lesser percentage of the total display screen. The rest of the screen of the display device 45 includes a media section 80, where the user 25 can display any desired type of content or sell this media section as video advertising space to other users. The space in the media section 80 can be sold by a user to other users in the same manner as the space in the display area 55. The media section 80 can display regular content from broadcast, cable or satellite television, or any type of media in the form of an image (e.g., JPG, GIF, etc), or video (e.g., WMV, AVI, etc.), or from a component input (e.g., cable box, VCR, DVD player, Dish Network box, XBOX 360, etc.). Further, the display area 80 may display nothing and may play music (e.g., MP3, WAV files) or show a sound spectrum. Also, the display device 45 can accept input from an IPOD or from USB devices like web cameras or IP cameras.

The uniform 'L' shaped display area 55 of the display device 45 is standard to the system 10 and is configured to adjust to the appropriate size and ratio of any display device 45. Thus, the overall size of the display area 55 changes according to the different sizes of display devices 45, but it always keeps a uniform aspect ratio. The display area 55 should not be so large as to overpower the media section 80 of the display device 45, but should be large enough so its content can attract the attention of viewers.

The system 10 provides a user with the opportunity to custom design the content that will be displayed on the 'L' shaped display area 55, but a user cannot change the shape or size of the display area 55. In another embodiment, the user can modify the size or the shape of the display area 55 to his or her preference. Further, the system 10 provides a user with the opportunity to upload custom media content that will display in the media section 80 of the display device 45. By using the system 10 (i.e., via the digital signage website), users can create, preview, and display the advertisement or other content that will play in the display area 55 of the display device 45 and/or the media section 80. Further, using the system 10, a user 25 can send customized content to other users to be displayed on device(s) 45 owned by these users. Also, a user 25 may custom design and upload content that is displayed on the media section 80 of the display device 45. In addition, a user 25 who owns a display device 45 can display one advertisement content (designed by the user or provided by other users via the system 10) on the 'L' shaped display area 55 and at the same time display different media content on the media section 80. The user can collect fees for displaying both types of content.

Figure 3:
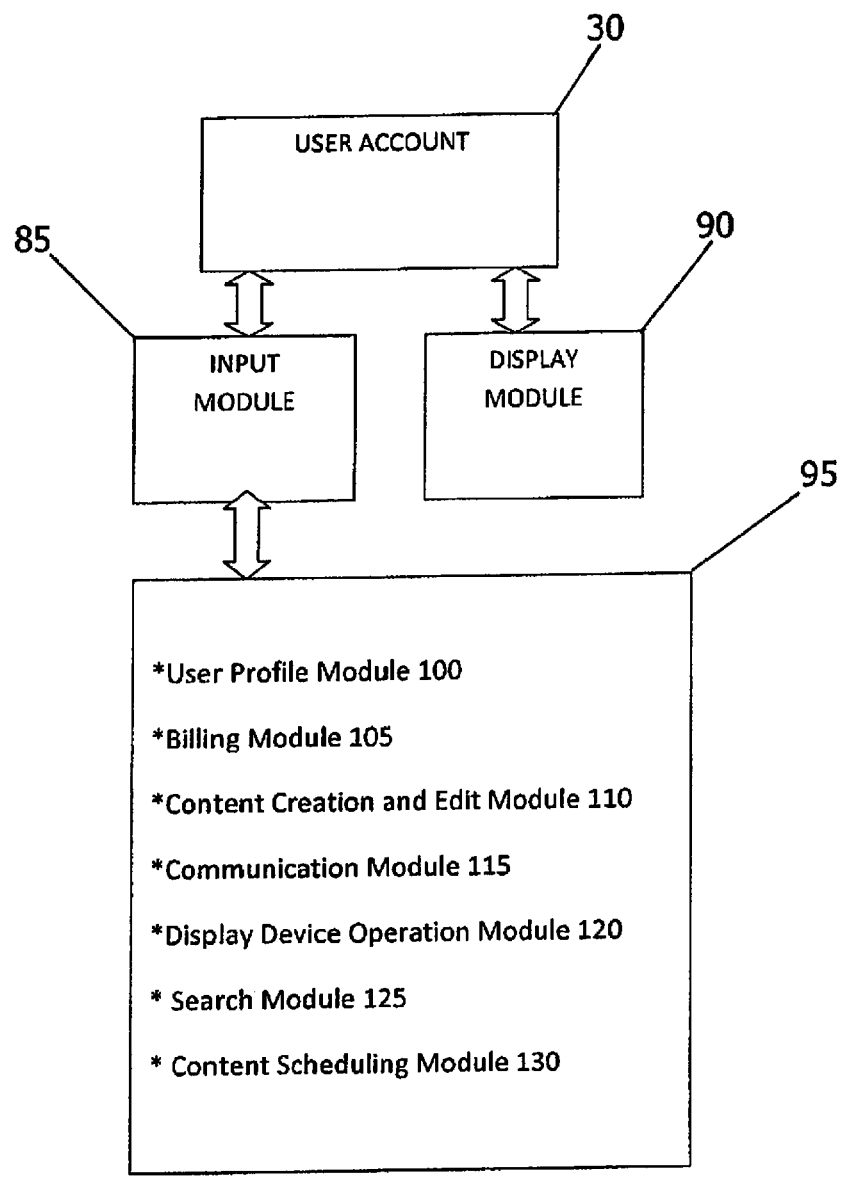
FIG. 3 is a diagram that represents an example of a user account for the digital signage system of FIG. 1.

FIG. 3 illustrates the general structure of a user account 30 of the digital signage system 10. As mentioned above, a user 25 is required to create a user account in order to use or participate in the network operated by the system 10. Generally, the user account 30 includes an input module 85 and a display module 90 that are located in the RAM and the ROM of the ECU 26. The input module 85 further includes a variety of system modules 95 that are stored as instructions in a memory (e.g., RAM or ROM) and, when executed by the ECU 26, assist a user 25 to control and manage all operations associated with the user account 30. These modules include a user profile module 100, a billing module 105, a content creation and edit module 110, a communication module 115, a display device operation module 120, a search module 125, and a content scheduling module 130. The display module 90 is operable to display content on a display device 45. In some embodiments, all modules 95 can be a combination of other modules and the system 10 can include more or less modules 95.

The input module 85 and the system modules 95 are created in any software development language and on any type of platform by using the system's proprietary Application programming interface (API). Examples of software languages include, but are not limited to, Adobe Flex, Adobe Flash, HTML, and Visual Basic. Examples of platforms include, but are not limited to, Windows, UNIX, Linux, and Google. The type of communication (delivery of content) between the input module 85 and the display module 90 depends on the type of software language and platform used to develop these modules. Examples of delivery methods of the created content include USB flash drive, WiFi, cellular, FTP, HTTP, UDP, or other Internet protocols.

With reference to the system modules 95 shown in FIG. 3, the user profile module 100 is configured to allow users 25 to create, modify, and manage the user account 30. To create a user account 30 users are required to provide the following information—company name (or personal name), contact name, company address, type of company, and a valid email address (i.e., account information). By providing this information, users 25 can create a profile for their company that can later be edited by using the user profile module 100. In other embodiments, the user does not have to provide his or her personal information, but this information is automatically extracted by the system 10 (e.g., from the user's Facebook profile). The user profile module 100 is operable to store user login and password information, as well as account information, in the user information database 36 located on the server 20. In one embodiment, for each account there is an administrator user. There also may be additional users (e.g., a general user). The default user in the account is the administrator, who has elevated privileges. The administrator and the general user of an account may be the same. An administrator of an account cannot be deleted by a general user of that account and has the ability to add, edit, and delete general users within the account. General users can only edit their own user information. In alternative embodiments, an administrative user may not exist and all users can have equal rights to the account. The user profile module 100 allows users to sign in the user account, to reset the user's password, to submit promotional codes to other users, to check the account balance and the promotion balance of the account, and to perform any other necessary functions associated with the user profile. In addition, a promotional code for a promotion may be offered by the system 10.

The billing module 105 is configured to allow users to create billing information and to process payments associated with the displayed content. As indicated above, all users 25 can set their own rates for displaying content on the display devices 45 that they operate. A user that operates more than one display device can set a different rate for each display device 45. These rates can depend on the location of the display device and the specific time that the content is being displayed. For example, a display device 45 located at a crowded coffee shop can have higher display rates than a display device located in a hospital waiting room. In addition, the fee for display time during a dinner rush hour in a restaurant can be higher than a display time during the slow afternoon hours. The user can set specific monthly rates that include displaying the content every day at a predetermined time(s). The system 10 (or its owners and operators) do not interfere with setting the display rates and allow users to set any desired rate, to create promotions and discounts, and even to play content provided by other users free of charge.

The billing module 105 is also operable to automatically processes payments associated with displaying content. For that purpose, the billing module 105 is configured to operate in connection with an existing payment processing system (e.g., PayPal, Google Checkout, Authorize.Net, etc.) that processes payments from a paying user and transfers the balance to the account of the billing user receiving the payment. In other embodiments, the billing module 105 can be an external module or third party software. In other embodiments. billing module 105 can operate with a payment processing system that is internal to the digital signage system 10. In addition, the billing module 105 is configured to automatically pay the user's monthly subscription to the system 10.

The content creation and edit module 110 is configured to allow users to custom design various content (e.g., advertisements) and to preview the created content on the user interface 40. As described above, the form and relative size of the displayed content is predetermined (e.g., 'L' shaped) and cannot be changed by a user 25. However, the user 25 can freely design the content to be displayed in the display area 55 and the media section 80. In one embodiment, the creation and edit module 110 includes a software editor (i.e., instructions implemented in software code) that allows the user to design the final content that is displayed in any portion of the screen of the display device 45. The designed final content can be in various formats (e.g., JPG, GIF, PNG, Word, XML, SWF, FLA) or can include a combination of any of these formats.

Using the software editor, the user can choose a background format from a variety of background profiles offered by the system and can modify this background. For example, a user has the ability to insert, arrange, and edit text, color, and images (e.g., JPG, GIF, etc.) into the content (e.g., company logo, photo, etc.). The user also has the ability to navigate an image to any viewable location within the predetermined form. Further, the user can change the aspect ratio (i.e., the size) and the opacity of each image. For example, the user can edit the visual effects (e.g., fade in, spin, etc.), the audio effects, and the rotation of images or text. Further, the software editor allows a user to modify text attributes such as font, font size, font color, border, bold, drop shadow, and justification. In other embodiments, the software editor allows a user to modify other text attributes not described herein.

By using the content creation and edit module 110, a user can select from a list of "designed wraps" or templates that are stored in the system and/or are displayed during the process of content creation. Also, designed wraps can be exclusively created by the user(s) of the individual account. For example, the "designed wraps" can be stored in a templates database 37 located on the server 20. Designed wraps can be stored, edited, and deleted at any time. Designed wraps can also be created by an outside source, uploaded to the system, saved and scheduled to play by a user. The user has the ability to filter the list of designed wraps and view if each wrap is scheduled or not. The user can view the wrap id, the created date, and the verified date (the date when the content was downloaded). Any user has the ability to view, delete, or copy the selected designed wrap. The user can create content in real time. Once a user creates the desired content, the module 110 allows a user to immediately play it back and review it. Further, the module 110 allows the user to save the content and to edit it at any time.

The communication module 115 is configured to allow users 25 to communicate with other users in the system 10. Users can send messages to other users and can also communicate with a nonuser, for example, to ask the nonuser to join the system 10. Users can share ideas, news, and comments regarding content and their profiles. Most importantly, users can send content display requests to other users. These requests generally include the content to be displayed (e.g., as an attachment), the desired display location (including a specific display device), the date and time of the display. Users can also negotiate the rates for displaying a particular content. The communication offered by the communication module 115 helps the users to create a network or community of subscribers where users with similar interests or locations can communicate and share display content. For example, businesses in a neighborhood can exchange content and ideas. Furthermore, because the system 10 is available online and easy to use, the system offers an opportunity to attract large numbers of users on a national and international level.

The display device operation module 120 is configured to assist with registering of a specific location 50 and a display device 45. As discussed above, one location/venue 50 can have more than one display device 45. Further, a user 25 having a user account 30 can have/operate one, several, or no display devices 45. In one embodiment, the following information is required for registering each location 50 with the system 10: location name, address, city, state, zip code, phone number, and location type (e.g., sports bar, hospital, etc.). That information is included in locations/devices database 38. In other embodiments, this and/or additional information can be included in a separate location database and screen/device database. When a device 45 is initially connected to the system 10, a device name and an IP address (of the display device computer 46) is extracted and attached to the user account. This information is updated periodically after the device is attached to the account. In one embodiment, only administrator users can delete display devices from a user account 30. In other embodiments, all users might have the same privileges and can edit display devices from a user account 30. A user can set up each display device 45 with different account characteristics. For example, each display device can be set up to either allow or not allow advertising requests. These setting can be viewed by other users when they search for locations and can be changed by the administrator/user for that device at any time. In the embodiment where a location or display device does not allow advertising requests, other users cannot see or search that location or device. The display device operation module 120 assists with updating a list of display devices that are at the same location as the current display device.

The display device operation module 120 is also configured to automatically extract additional information from the received location address, zip code, and IP address information. For example, by using the IP address, the display device operation module 120 can determine the user's Internet service provider and the speed of their Internet service. Further, by using the zip code, the display device operation module 120 can extract the latitude, longitude, and county information (i.e., the GPS location) of the display device to determine the designated market area ("DMA") and DMA rank associated with the location of the device. In other embodiments, geolocating can be used to determine the exact location of a mobile device or the geographical location of a display device based on the IP address.

The search module 125 is configured to retrieve a list of display devices and locations based on a search performed by a user 25. For example, these devices and locations are retrieved from the locations/devices database 38. A user performs a search by using any of the characteristics associated with a display device 45: device name, IP address, location name, address, city, state, zip code, phone number, DMA, and location type. After a search is performed, a user selects the location(s) and the specific display device (if more than one is available at that location) where the user wants content to be displayed. A user also selects the content to be displayed, the duration of display (generally the duration is 15 seconds), the time frame of display (e.g., between 4:15 p.m. and 4:30 p.m.), and the time period during which content will be displayed. In one embodiment, a content can be arranged to display after a previous content is done playing, and not during a specific time slot. In some embodiments, content may be displayed and paid for on a monthly basis. In other embodiments, payments may be submitted in different ways (e.g., daily, weekly, pay according to number of displays, etc.)

The content scheduling module 130 is configured to assist users with scheduling of the display of their content on device(s) previously identified with the search module 125. After the user selects the display devices(s), the user sends a message to the user account associated with the selected display device(s). The owner of a display device receives the message and, in addition, the content to be displayed is transferred to the user account pending approval. While approval/acceptance of the content is pending, the user that sent the request can delete the request if not approved in a predetermined time frame. In one embodiment, the request will be automatically canceled by the system if not approved within a predetermined time frame. If the owner of the device accepts the content, the content is automatically downloaded to the display device computer 46 associated with the display device 45 that will be displaying the content. The download process also results in the transfer of the funds associated with the display to the appropriate account.

Further, the content scheduling module 130 operates to assist the owner of a display device(s) with organizing and scheduling of the received requests pending approval. In one embodiment, if the owner of the display device approves the request(s) for display, the content scheduling module 130 inserts the content into the current play list for the display device that includes a detailed timeline table with the approved and scheduled content. In other embodiments, the play list can be arranged in systematic order, where the items display in order with no regard to a specific timeline. The owner of the display device can not delete content that has been approved by the owner and included in the play list of the display device by the system 10. In alternative embodiments, the owner of the display device may modify the play list (e.g., when a requesting user cancels an approved request and requests a refund) and can cancel or reschedule content. In other embodiments, the owner can appeal to the operator of the system 10 in order to remove inappropriate content. The system 10 schedules and plays the content on the display device 45 in the selected time frame. The system 10 also creates a library that keeps track of the played content. In one embodiment, the system 10 may provide repeating predetermined play periods of the play list. One example, would be 15-minute play periods for a particular play list (i.e., the play list will be repeated four times per hour). Other play periods may be used where desirable. In this example, the user's content will be repeatedly displayed every 15-minutes, but not necessarily in the same position on the play list. The content, which may, for example, be displayed for 15-seconds, can be moved within that 15-minute time frame by the owner of the display device, but ultimately will play at some point within the 15-minute interval. The display device 45 can also switch between multiple play lists during the day.

Figure 4:
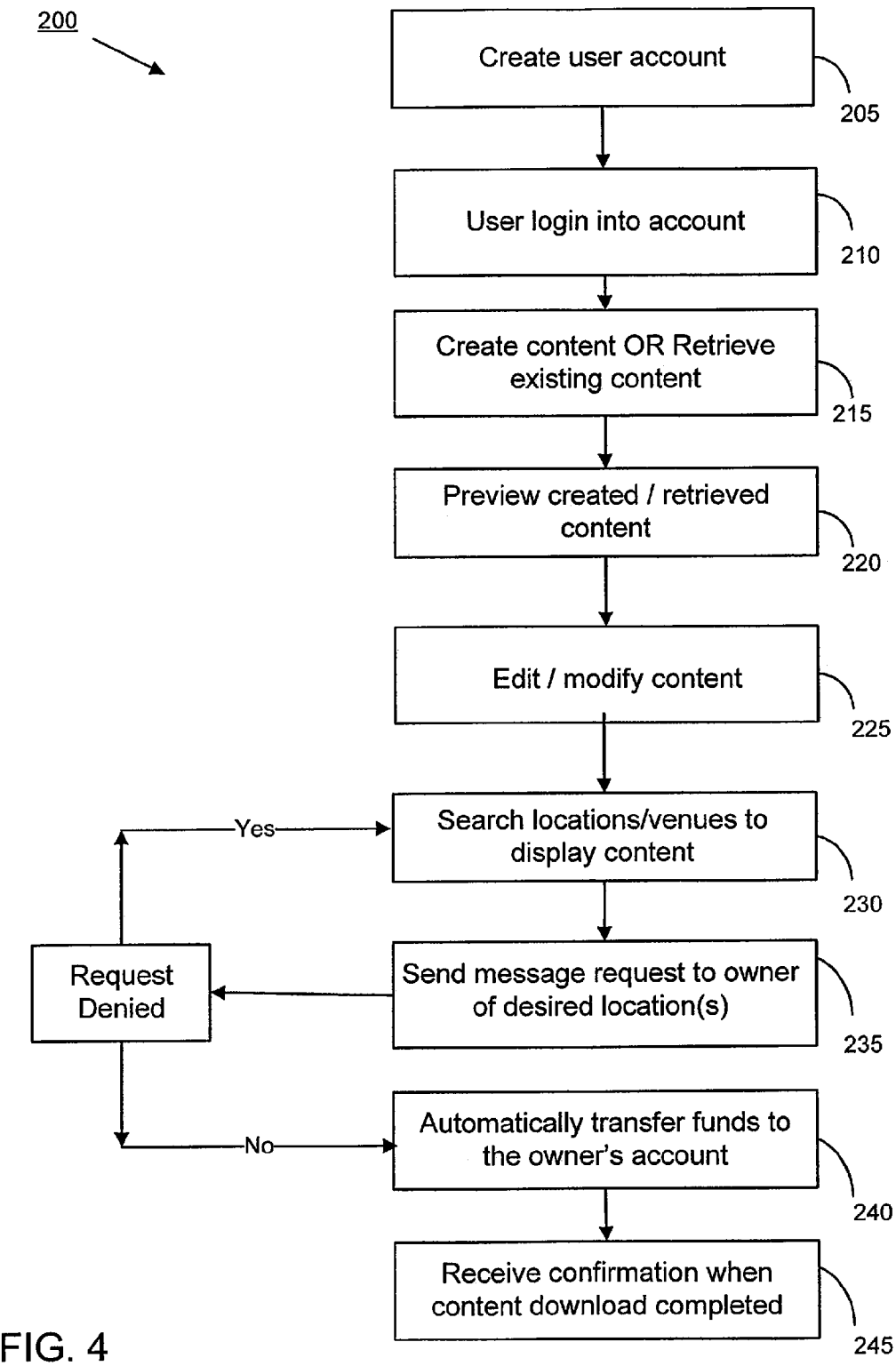
FIG. 4 is a block diagram that illustrates the operation of the digital signage system of FIG. 1 where content provided by a user is displayed on a display device owned by another user.
Figure 5:
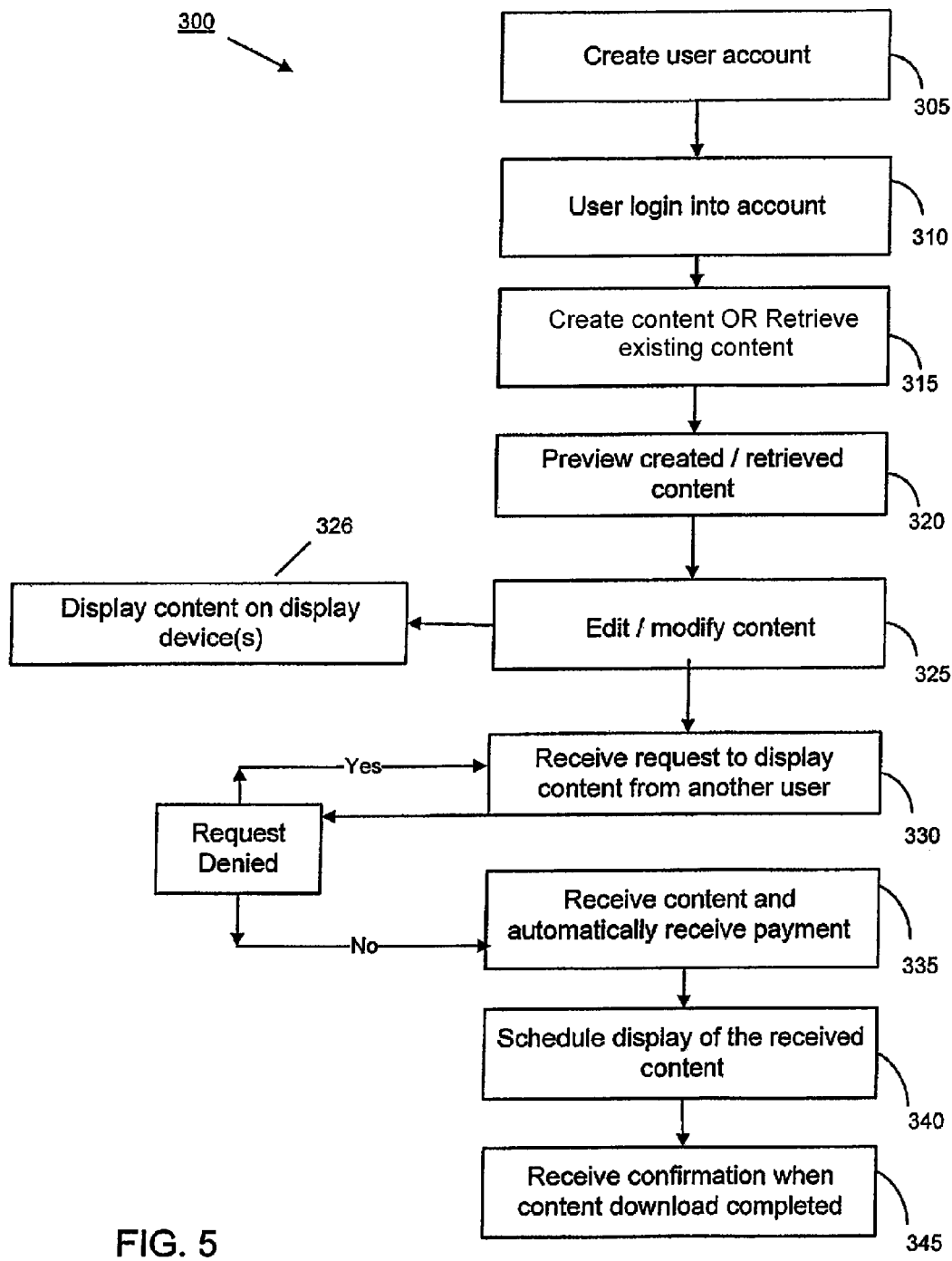
FIG. 5 is a block diagram that illustrates the operation of the digital signage system of FIG. 1 where a user that owns a display device either displays his own content or also displays content provided by another user.

The instructions stored in the computer-readable media provide particular functionality when executed by the ECU 26. One example of the operation of the digital signage system 10 is shown in FIGS. 4 and 5. FIG. 4 illustrates a process 200 that shows the operation of the digital signage system 10 from the viewpoint of a user 25 that creates content and requests that the created content is displayed by other users 25. First, the user 25 creates a user account 30 (step 205) using the user profile module 100. Next, using a user interface 40, the user 25 logs into the created user account 30 (step 210) and connects to the network of digital signage subscribers. The user 25 then creates his or her custom designed content using the content creation and edit module 110 (step 215). In the alternative, in step 215, the user retrieves a previously created content that is associated with the user account 30 and is stored in the memory (e.g., RAM or ROM) or on an external memory module (e.g., flash drive, disk, etc.). In the next step, the user 25 previews the created or retrieved content (step 220). As described above, the content creation and edit module 110 of the system 10 is configured to allow the user 25 to instantly preview the created content.

After previewing the created/retrieved content, the user 25 may edit or modify the content by using the content creation and edit module 110 (step 225). The user 25 then uses the search module 125 to search for locations of display devices 45 of other users on which he or she wants to display the created content (step 230). The search retrieves the desired locations and display devices, whether a location/device allows advertising requests, the prices associated with the location and device, and the available time periods for display. After the user finds the desired location(s), the user sends a message request to the owner of the desired location/display device via the communication module 115 (step 235). The user sending the request and the owner of the device can also exchange messages regarding the price of the display (e.g., they can negotiate the price).

If the owner/user of the desired location/display device denies the request of the user, the user receives a "request denied" message and the process goes back to step 230 where the user performs another search. If the owner/user of the desired location/display device accepts the request to display content sent by a user 25, the system 10 automatically downloads the content to be displayed to the computer 46 of the display device 45 that will be displaying the content. Further, the system transfers the funds for the display of the content from the requesting user's account to the owner/user's account by using the billing module 105 (step 240). The user 25 can also receive a confirmation message that the download of the content is completed (step 245). In one embodiment, no message is received, but the user 25 can view on his account that the download is completed. In an alternative embodiment, the requesting user can view the play list of the display device 45 and verify that the content is being displayed.

FIG. 5 illustrates a process 300 that shows the operation of the digital signage system 10 from the viewpoint of an owner/user that operates display devices, receives requests, and displays his own content or content sent from other users. An owner/user that displays content of other users can also request that his/her content be displayed by other owner users. Steps 305-325 in the process 300 are thus the same as steps 205-225 in the process 200 described above. The owner or user 25 owns or operates at least one display device 45, but may own or operate more than one display device in more than one location. An owner/user who creates content can display that content on one or more display devices that he/she owns/operates (step 326). In step 330, the owner/user 25 receives a request to display content by another user 25 via the communication module 115. The request specifies the desired location/display device(s), the price associated with the display (the requesting user may offer a different price than the one generally associated with the display device), and the desired time frame for display. If the owner/user does not agree with the proposed terms or the content, a "request denied" message is sent to the requesting user and the process goes back to step 330, where the owner/user may receive another request. In addition, the owner/user can receive several display requests from one requesting user or from several requesting users.

If the owner/user accepts the request, the system 10 automatically downloads the content and transfers the funds associated with the display from the requesting user account to the owner/user account by using the billing module 105 (step 335). In the next step, the content scheduling module 130 schedules the display of the received content (step 340). Finally, the user account of the owner/user 25 can send a confirmation message to the requesting user when the content is downloaded (step 345). In one embodiment, the confirmation message from the owner/user to the requesting user is automatically sent after the content is downloaded. In another embodiment, no confirmation is sent, but the requesting user can view on his account that the download is completed or can view the play list of the display device 45 in order to verify that the content is being displayed.

Although the invention is described for use with a user interface 40, in some embodiments, a user interacts with the server 20 as described above using a mobile device (e.g., mobile telephone, PDA, iPad, etc.) or other electronic device with either a web browser or digital signage software application being executed thereon. For instance, in some embodiments, a user navigates a digital signage website using a mobile computing device using either a web browser or a digital signage application that performs the functions described herein.

What is claimed is:

1. A method of operating an online community wherein each of a plurality of users of the online community has access to a plurality of display devices and wherein each of the plurality of display devices is associated with a display device computer, the method comprising:
    establishing, by a processor of a computer, a database, the database storing a plurality of user account records, wherein each user account record is associated with a user of the online community;
    receiving, by a processor of a computer, a request to establish a first user account for a first user to be included in the plurality of users of the online community;
    receiving, by the processor, an identifier of the first user;
    automatically storing, by the processor, a record of the first user account for the first user to the plurality of user account records stored in the database, wherein the record of the first user account includes an identifier of the first user and does not include an identifier of any of the plurality of display devices accessible through the online community;

receiving, by the processor, a request to establish a second user account for a second user to be included in the plurality of users of the online community;

receiving, by the processor, an identifier of the second user, a messaging address of the second user, an address of a display device to be included in the plurality of display devices accessible through the online community, and a display price for the display device, wherein the display price is a rate for displaying data on the display device;

automatically storing, by the processor, a record of the second user account for the second user to the plurality of user account records stored in the database, wherein the record of the second user account includes the identifier of the second user, the messaging address of the second user, an identifier of the display device, the address of the display device, and the display price of the display device;

receiving, by the processor, a request to log into the first user account from a user computer;

in response to verifying the request to log into the first user account, receiving, by the processor, a search request from the user computer, the search request specifying one or more parameters for display devices sought by the first user;

automatically retrieving from the database, by the processor, at least one record matching the search request, wherein the at least one record includes the record of the second user account;

automatically transmitting, by the processor, data regarding the display device identified in the record of the second user account to the user computer, wherein transmitting the data includes transmitting the display price for the display device;

receiving, by the processor, a selection of the display device identified in the record of the second user account from the user computer;

receiving, by the processor, content from the user computer;

in response to the selection, automatically retrieving, by the processor, the messaging address of the second user included in the record of the second user account from the database;

in response to the selection, automatically generating and transmitting, by the processor, an electronic message to the messaging address of the second user, the electronic message including a request to display the content on the display device;

in response to receiving a reply to the request including an acceptance of the request, transmitting, by the processor, the content over a communication network to a display device computer associated with the display device, wherein the display device computer controls the display device to display the content on the display device; and wherein transmitting the content in response to the reply including an acceptance of the request includes automatically downloading the content to the selected display device and automatically processing a payment from an account associated with the first user to an account associated with the second user when the automatic download completes successfully.

2. The method of claim 1, further comprising automatically generating and sending an email message to the first user when the automatic download completes successfully.

3. A method of operating an online community wherein each of a plurality of users of the online community has access to a plurality of display devices and wherein each of the plurality of display devices is associated with a display device computer, the method comprising:

establishing, by a processor of a computer, a database, the database storing a plurality of user account records, wherein each user account record is associated with a user of the online community;

receiving, by a processor of a computer, a request to establish a first user account for a first user to be included in the plurality of users of the online community;

receiving, by the processor, an identifier of the first user;

automatically storing, by the processor, a record of the first user account for the first user to the plurality of user account records stored in the database, wherein the record of the first user account includes an identifier of the first user and does not include an identifier of any of the plurality of display devices accessible through the online community;

receiving, by the processor, a request to establish a second user account for a second user to be included in the plurality of users of the online community;

receiving, by the processor, an identifier of the second user, a messaging address of the second user, an address of a display device to be included in the plurality of display devices accessible through the online community, and a display price for the display device, wherein the display price is a rate for displaying data on the display device;

automatically storing, by the processor, a record of the second user account for the second user to the plurality of user account records stored in the database, wherein the record of the second user account includes the identifier of the second user, the messaging address of the second user, an identifier of the display device, the address of the display device, and the display price of the display device;

receiving, by the processor, a request to log into the first user account from a user computer;

in response to verifying the request to log into the first user account, receiving, by the processor, a search request from the user computer, the search request specifying one or more parameters for display devices sought by the first user;

automatically retrieving from the database, by the processor, at least one record matching the search request, wherein the at least one record includes the record of the second user account;

automatically transmitting, by the processor, data regarding the display device identified in the record of the second user account to the user computer, wherein transmitting the data includes transmitting the display price for the display device;

receiving, by the processor, a selection of the display device identified in the record of the second user account from the user computer;

receiving, by the processor, content from the user computer;

in response to the selection, automatically retrieving, by the processor, the messaging address of the second user included in the record of the second user account from the database;

in response to the selection, automatically generating and transmitting, by the processor, an electronic message to the messaging address of the second user, the electronic message including a request to display the content on the display device;

in response to receiving a reply to the request including an acceptance of the request, automatically transmitting, by the processor, the content over a communication network to a display device computer associated with the display device, wherein the display device computer controls the display device to display the content on the display device; and automatically cancelling the request when the second user does not accept or reject the request with a predetermined period of time.

4. A method of operating an online community wherein each of a plurality of users of the online community has access to a plurality of display devices and wherein each of the plurality of display devices is associated with a display device computer, the method comprising:

establishing, by a processor of a computer, a database, the database storing a plurality of user account records, wherein each user account record is associated with a user of the online community;

receiving, by a processor of a computer, a request to establish a first user account for a first user to be included in the plurality of users of the online community;

receiving, by the processor, an identifier of the first user;

automatically storing, by the processor, a record of the first user account for the first user to the plurality of user account records stored in the database, wherein the record of the first user account includes an identifier of the first user and does not include an identifier of any of the plurality of display devices accessible through the online community;

receiving, by the processor, a request to establish a second user account for a second user to be included in the plurality of users of the online community;

receiving, by the processor, an identifier of the second user, a messaging address of the second user, an address of a display device to be included in the plurality of display devices accessible through the online community, and a display price for the display device, wherein the display price is a rate for displaying data on the display device;

automatically, by the processor, determining additional location information for the display device based on the address of the display device;

automatically storing, by the processor, a record of the second user account for the second user to the plurality of user account records stored in the database, wherein the record of the second user account includes the identifier of the second user, the messaging address of the second user, an identifier of the display device, the address of the display device, the display price of the display device, and the additional location information for the display device;

receiving, by the processor, a request to log into the first user account from a user computer;

in response to verifying the request to log into the first user account, receiving, by the processor, a search request from the user computer, the search request specifying one or more parameters for display devices sought by the first user;

automatically retrieving from the database, by the processor, at least one record matching the search request, wherein the at least one record includes the record of the second user account;

automatically transmitting, by the processor, data regarding the display device identified in the record of the second user account to the user computer, wherein transmitting the data includes transmitting the display price for the display device and the additional location information for the display device;

receiving, by the processor, a selection of the display device identified in the record of the second user account from the user computer;

receiving, by the processor, content from the user computer;

in response to the selection, automatically retrieving, by the processor, the messaging address of the second user included in the record of the second user account from the database;

in response to the selection, automatically generating and transmitting, by the processor, an electronic message to the messaging address of the second user, the electronic message including a request to display the content on the display device; and in response to receiving a reply to the request including an acceptance of the request, automatically transmitting, by the processor, the content over a communication network to a display device computer associated with the display device, wherein the display device computer controls the display device to display the content on the display device.

5. The method of claim 4, wherein determining the additional location information includes determining at least one selected from the group comprising an Internet service provider and an Internet service speed.

6. The method of claim 4, wherein determining the additional location information includes determining at least one selected from the group comprising a country, a latitude, and a longitude.

7. The method of claim 4, wherein determining the additional location information includes determining a market area.

8. The method of claim 7, further comprising automatically determining a rank of the display device within the market area.

9. The method of claim 8, further comprising automatically determining a rank for each of the plurality of display devices and storing the rank for each of the plurality of display devices in the database.

10. The method of claim 9, wherein automatically transmitting the data regarding the display device associated with the record of the second user account to the user computer includes automatically transmitting the rank associated with the display device based on the database.

* * * * *